(12) United States Patent
He et al.

(10) Patent No.: US 9,277,273 B2
(45) Date of Patent: Mar. 1, 2016

(54) VIDEO DATA CONVERSION METHOD, DEVICE AND SMART TV

(71) Applicant: MStar Semiconductor, Inc., Hsinchu County (TW)

(72) Inventors: Hong-Bo He, Hsinchu County (TW); Ming-Yong Sun, Hsinchu County (TW)

(73) Assignee: MSTAR SEMICONDUCTOR, INC., Hsinchu County (TW)

(*) Notice: Subject to any disclaimer, the term of this patent is extended or adjusted under 35 U.S.C. 154(b) by 220 days.

(21) Appl. No.: 14/089,929

(22) Filed: Nov. 26, 2013

(65) Prior Publication Data

US 2014/0157315 A1 Jun. 5, 2014

(30) Foreign Application Priority Data

Nov. 30, 2012 (CN) .......................... 2012 1 0507851

(51) Int. Cl.
*H04N 21/47* (2011.01)
*H04N 21/482* (2011.01)
*G09G 5/02* (2006.01)
*G09G 5/39* (2006.01)
*G06T 19/00* (2011.01)
*G06T 15/04* (2011.01)
*G06T 7/00* (2006.01)
*H04N 21/4402* (2011.01)
*H04N 21/81* (2011.01)

(52) U.S. Cl.
CPC .......... *H04N 21/4402* (2013.01); *H04N 21/47* (2013.01); *H04N 21/816* (2013.01)

(58) Field of Classification Search
CPC combination set(s) only.
See application file for complete search history.

(56) References Cited

U.S. PATENT DOCUMENTS

| | | | |
|---|---|---|---|
| 2003/0058238 A1* | 3/2003 | Doak | G06T 19/00 345/419 |
| 2006/0279630 A1* | 12/2006 | Aggarwal | G01S 3/7864 348/143 |
| 2010/0110162 A1* | 5/2010 | Yun | H04N 13/0048 348/42 |
| 2010/0214598 A1* | 8/2010 | Hoppenot | G06F 3/1205 358/1.15 |

FOREIGN PATENT DOCUMENTS

| | | |
|---|---|---|
| CN | 1920886 | 2/2007 |
| TW | 200923832 | 6/2009 |

OTHER PUBLICATIONS

Taiwan Patent Office, "Office Action," Jun. 9, 2015.

* cited by examiner

*Primary Examiner* — Wesner Sajous
(74) *Attorney, Agent, or Firm* — WPAT, PC; Justin King (57) ABSTRACT

A video data conversion method is provided. The video data conversion method comprises the following steps. Video images currently played on a video source are captured, and are converted into dynamic texture data having a size and a format that meet requirements of a three-dimensional (3D) engine. The dynamic texture data is sent to the 3D engine, which then generates a map from the dynamic texture data. The map is mapped to a 3D user interface (UI) to generate a dynamic texture map.

20 Claims, 5 Drawing Sheets

---

Capturing video source currently played on video source, and converting video image to dynamic texture data have size and format required by 3D engine — S101

Transmitting dynamic texture data to 3D engine so that 3D engine generates map from the dynamic texture data — S102

Mapping map to 3D UI to obtain dynamic texture map — S103

VIDEO DATA CONVERSION METHOD, DEVICE AND SMART TV

This application claims the benefit of People's Republic of China application Serial No. 201210507851.6, filed Nov. 30, 2012, the subject matter of which is incorporated herein by reference.

BACKGROUND OF THE INVENTION

1. Field of the Invention

The invention relates to a video data conversion method, associated device and a smart TV.

2. Description of the Related Art

With continual developments of video technologies, three-dimensional (3D) user interface (UI) smart TVs are becoming one mainstream that offers users with increasingly ideal TV operation experiences. However, although a common 3D UI smart TV appears to have a more sophisticated interface, it essentially utilizes a conventional static mapping method. Further, the playback of video and programs on the 3D UI smart TV also inherits a prior two-dimensional (2D) display method in a way that the static maps and the video data are not at all correlated.

SUMMARY OF THE INVENTION

The invention is directed to a video conversion method and device for converting video data of a program into stable and continuous dynamic texture maps, thereby providing novel program previewing and playback modes.

According to an aspect of the present invention, a video data conversion method is provided. The video data conversion method comprises the following steps. Video images currently played on a video source are captured, and are converted into dynamic texture data having a size and a format that meet requirements of a three-dimensional (3D) engine. The dynamic texture data is sent to the 3D engine, which then generates a map from the dynamic texture data. The map is mapped to a 3D user interface (UI) to generate a dynamic texture map.

According to another aspect of the present invention, a video data conversion device is provided. The video data conversion device comprises a capture module, a transmission module and a mapping module. The capture module captures video images currently played on a video source, converts the video images into dynamic texture data having a size and a format that meet requirements of a 3D engine, and outputs the dynamic texture data to the transmission module. The transmission module sends the dynamic texture data to the mapping module. The mapping module generates a map from the dynamic texture data, and maps the map to a 3D UI to obtain a dynamic texture map.

According to yet another aspect of the present invention, a smart TV comprising the above video data conversion device is provided.

In the video data conversion device, the associated method and the smart TV of the present invention, video images are captured and converted into dynamic texture data, and a new map is generated from the dynamic texture data by a 3D engine and mapped to a 3D UI. Thus, video data is converted to stable and continuous dynamic texture maps to achieve a higher frame rate. Further, video of a program is presented by incorporating 3D effects to offer users with enhanced viewing experiences.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
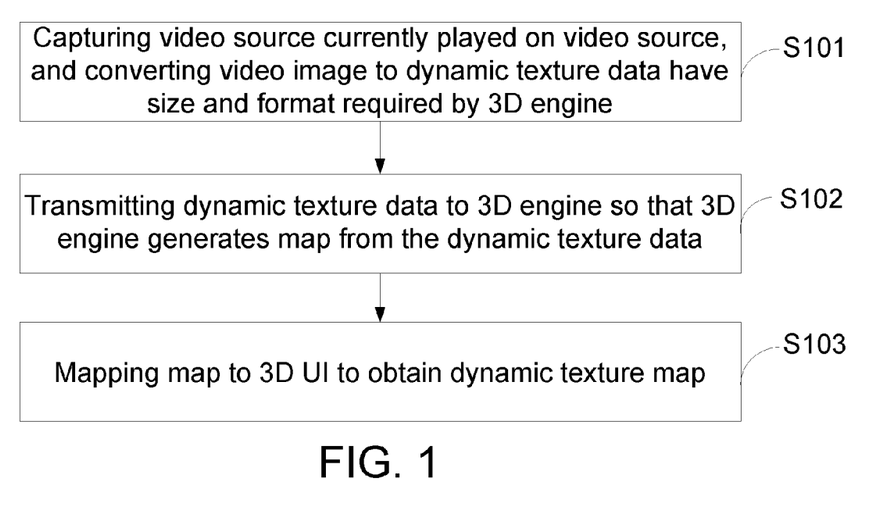
FIG. 1 is a flowchart of a video data conversion method according to an embodiment of the present invention.

FIG. 1 shows a flowchart of a video data conversion method according to an embodiment of the present invention. With reference to FIG. 1, the video data conversion method comprises the following steps.

In step S101, video images currently played on a video source are captured, and are converted into dynamic texture data having a size and a format required by a 3D engine.

A common smart TV supports video program sources including digital television (DTV), analog television (ATV), high-definition multimedia interface (HDMI), and video graphics array (VGA) sources. A video source, e.g., DTV, appointed by an upper tier is selected through a multiplexer. Video images currently played on the video source are captured, and then converted into dynamic texture data having a size and a format required by a 3D engine. The dynamic texture data obtained is stored into a register of a video service process.

In step S102, the dynamic texture data is sent to the 3D engine, which then generates a map from the dynamic texture data. That is, upon receiving a request for the dynamic texture data, the dynamic texture data is sent to the 3D engine, so that the 3D engine generates a map from the dynamic texture data.

In step S103, the map is mapped to a 3D user interface (UI) to obtain a dynamic texture map. More specifically, after the 3D engine generates the map, the map is mapped to the 3D UI to obtain a dynamic texture map. The dynamic texture map may be forwarded to a display screen for display.

Through the process of the above embodiment of the present invention, video images are captured and converted into dynamic texture data, and a new map is generated from the dynamic texture data by a 3D engine and mapped to a 3D UI. Thus, video data is converted to stable and continuous dynamic texture maps to achieve a higher frame rate. Further, video of a program is presented by incorporating 3D effects to offer users with enhanced viewing experiences.

Figure 2:
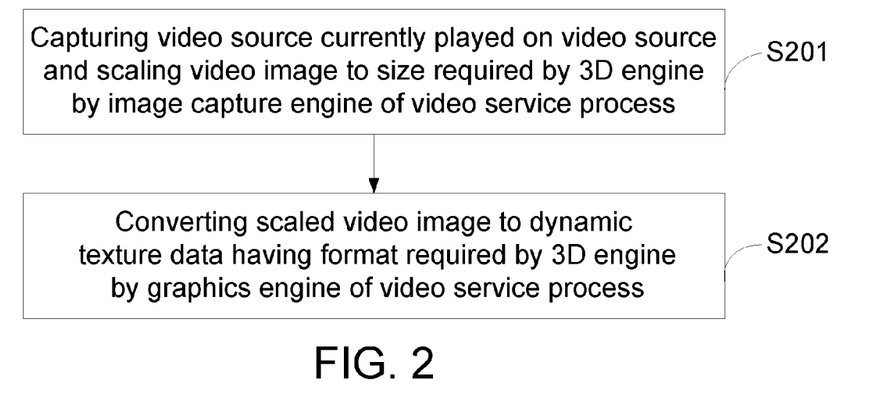
FIG. 2 is a flowchart of capturing video images and converting the video images into dynamic texture data having a size and a format that meet requirements of a 3D engine in a video data conversion method according to an embodiment of the present invention.

Referring to FIG. 2, in one embodiment, the step of capturing the video images and converting the video images into the dynamic texture data having the size and the format required by the 3D engine comprises the following sub-steps.

In sub-step S201, the video images currently played on the video source are captured by an image capture engine of a video service process, and the captured video images are scaled to the size required by the 3D engine.

In practice, when a system is activated, the video service process, the camera service process and the 3D UI are activated and connections thereof are established. Thus, a request can be sent to the camera service process whenever an upper tier demands dynamic texture data.

In a common Android smart TV, the video images currently played on the video source are captured through the image capture engine of the video service process, and the captured video images are scaled to the size required by the 3D engine. The scaled video images are forwarded to a graphics engine of the video service process.

To better integrate the video service process into an Android system architecture, the video service process may be virtualized as a virtual camera device of a camera service process. Thus, in addition to a physical camera device having an identity "0" as acknowledged by the system, the camera service process also has a virtual device, which is the video service process having an identity "1". As such, not only a seamless connection between the video service process and the Android system is achieved, but also an interface implementing the video service process becomes more powerful in providing more flexible functions such as dynamic capturing and video recording. Further, the 3D engine may also be flexibly connected to another video source interface, e.g., a physical camera device having an identity "0".

In sub-step S202, the scaled video images are obtained through the graphics engine of the video service process, and are converted into the dynamic texture data having the format required by the 3D engine. More specifically, after the graphics engine of the video service process obtains the scaled video images from the image capture engine, the scaled video images are converted into the dynamic texture data having the format required by the 3D engine, and the dynamic texture data is stored into a register of the video service process.

Figure 3:
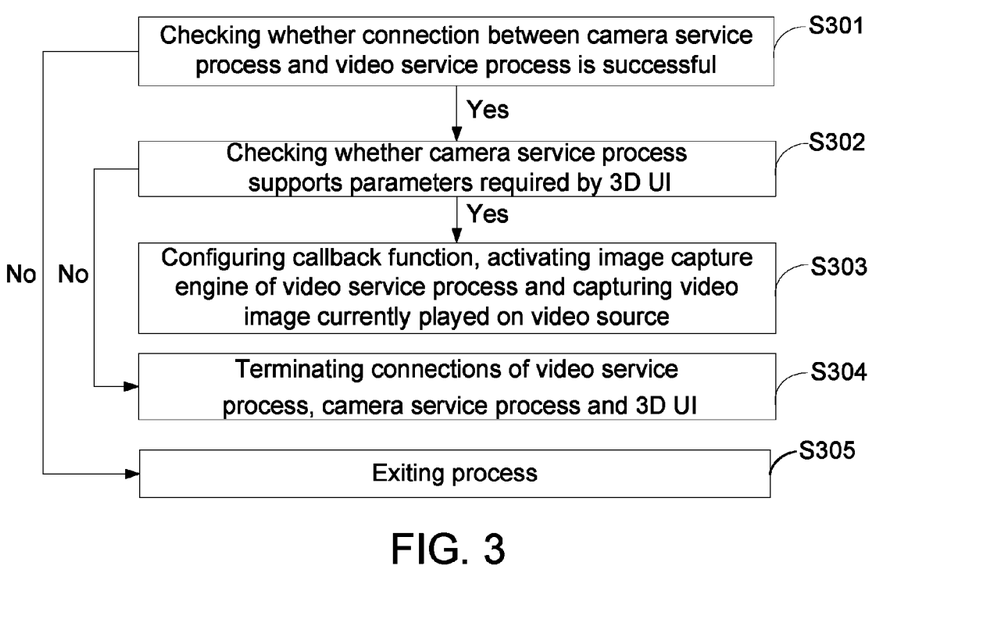
FIG. 3 is a flowchart of establishing connections for a video service process, a camera service process and a 3D UI in a video data conversion method according to an embodiment of the present invention.

Referring to FIG. 3, in one embodiment, the step of establishing the connections for the video service process, the camera service process and the 3D UI comprises the following sub-steps.

In sub-step S301, it is checked whether a connection between the camera service process and the video service process is successful. Sub-step S302 is performed if yes, or else sub-step S305 is performed if no.

In sub-step S302, it is checked whether the camera service process supports parameters required by the 3D UI. When the connection between the camera service process and the video service process is successful, it is checked whether the camera service process supports parameter configurations required by the 3D UI. Sub-step S303 is performed if yes, or else sub-step S304 is performed if no.

In sub-step S303, a callback function is configured to activate the image capture engine of the video service process to further capture the video images currently played on the video source. When the camera service process supports the parameter configurations required by the 3D UI, a callback function is configured. The callback function is a callback function for data transmission, and includes a callback function of the camera service process and a callback function of the 3D UI. The image capture engine of the video service process is at the same time activated to capture the video images currently played on the video source.

In sub-step S304, the connections of the video service process, the camera service process and the 3D UI are terminated. When the camera service process does not support the parameter configurations required by the 3D UI, the connections of the video service process, the camera service process and the 3D UI are terminated.

In sub-step S305, the process ends. Upon detecting that the connection between the camera service process and the video service process is unsuccessful, an abnormality is determined, and the connection of the video service process is terminated to exit the process.

Figure 4:
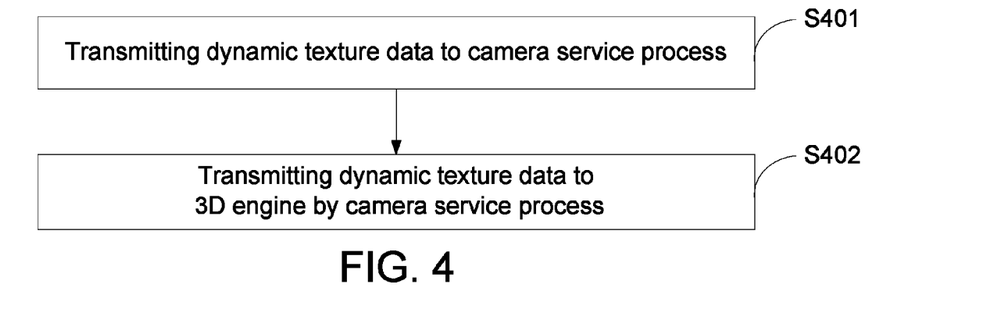
FIG. 4 is a flowchart of transmitting dynamic texture data in a video data conversion method according to an embodiment of the present invention.

Referring to FIG. 4, the step of transmitting dynamic texture data to the 3D engine comprises the following sub-steps.

In sub-step S401, the dynamic texture data is transmitted to the camera service process. After the video service process receives a request from the camera service process asking for the dynamic texture data, the dynamic texture data is obtained from the register of the video service process, and is transmitted to the camera service process.

In sub-step S402, the camera service process transmits the dynamic texture data to the 3D engine. That is, after the camera service process receives a request from the 3D engine asking for the dynamic texture data, the camera service process transmits the dynamic texture data to the 3D engine.

Figure 5:
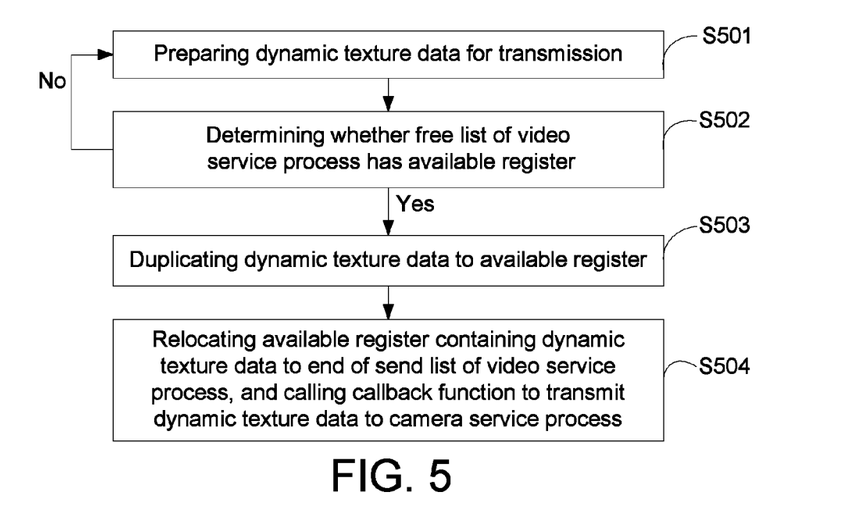
FIG. 5 is a flowchart of transmitting dynamic texture data to a camera service process in a video data conversion method according to an embodiment of the present invention.

Referring to FIG. 5, in one embodiment, the step of transmitting the dynamic texture data to the camera service process comprises the following sub-steps.

In sub-step S501, the dynamic texture data is prepared for transmission. More specifically, after the video service process receives the request from the camera service process asking for the dynamic texture data, an image capture engine application interface (API) is called to wait and capture for a next set of dynamic texture data for transmission. When the next set of dynamic texture data is not yet ready, the process hibernates as the current API is called and is woken up when the data is ready.

In sub-step S502, it is determined whether a free list of the video service process has an available register. The process proceeds to sub-step S503 if the available register exists, or else the process iterates sub-step S501 to again prepare the dynamic texture data for transmission.

In sub-step S503, the dynamic texture data is duplicated to the available register. When the free list has the available register, the available register is fetched, and the dynamic texture data is duplicated into the register to be ready for transmission to the camera service process.

In sub-step S504, the available register containing the dynamic texture data is relocated to an end of a send list of the video service process, and the callback function is called to transmit the dynamic texture data to the camera service process. More specifically, after duplicating the dynamic texture data to the currently available register, the available register containing the dynamic texture data is relocated to an end of a send list of the video service process, and the callback function is called to transmit the dynamic texture data to the camera service process.

Figure 6:
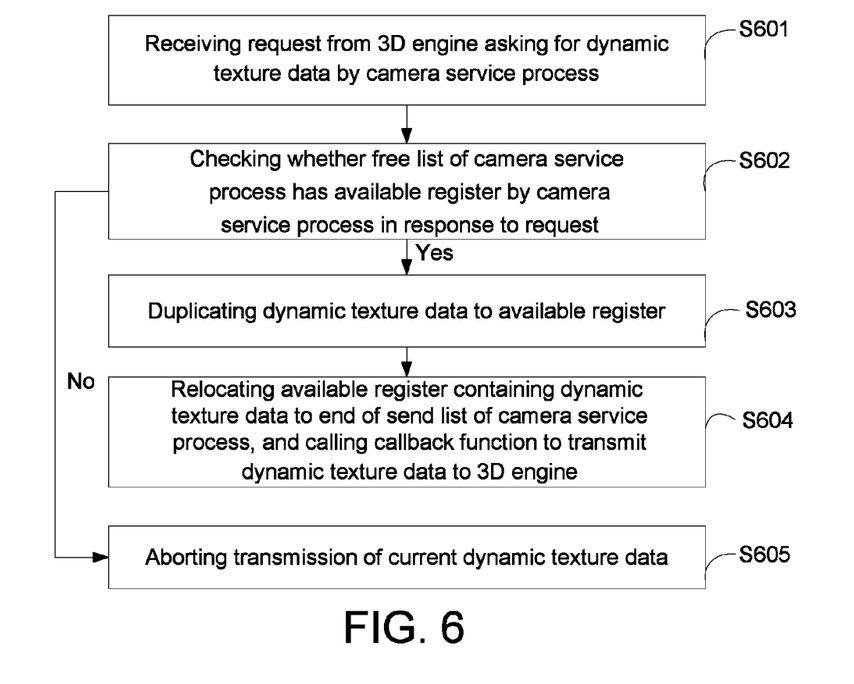
FIG. 6 is a flowchart of a camera service process transmitting dynamic texture data to a 3D engine in a video data conversion method according to an embodiment of the present invention.

Referring to FIG. 6, the step of transmitting the dynamic texture data to the 3D engine comprises the following sub-steps.

In sub-step S601, the camera service process receives the request from the 3D engine asking for the dynamic texture data. When the 3D engine needs the dynamic texture data, the 3D engine sends a request to the camera service process to ask for the dynamic texture data. The camera service process receives the request from the 3D engine, and prepares the dynamic texture data for transmission.

In sub-step S602, the camera service process checks whether a free list in the camera service process has an available register in response to the request. That is, the camera service process checks whether a free list in the camera service process has an available register. Sub-step S603 is performed when an available register exists, or else sub-step S605 is performed.

In sub-step S603, the dynamic texture data is duplicated to the available register. When the free list of the camera service process has an available register, the register is fetched, and the dynamic texture data is duplicated into the available register.

In sub-step S604, the available register containing the dynamic texture data is relocated to an end of a send list of the camera service process, and the callback function is called to transmit the dynamic texture data to the 3D engine. That is, the available register containing the dynamic texture data is relocated to an end of a send list of the camera service process, and the callback function of the 3D engine is called to transmit the dynamic texture data to the 3D engine to complete the transmission of the dynamic texture data from the camera service process to the 3D engine. The current process ends.

In sub-step S605, the transmission for the dynamic texture data is aborted. If the free list of the camera service process does not have an available register due to certain reasons, such as the system being busy or previously sent registers being not fully processed, the transmission for the current dynamic texture data is aborted, and it is waited for the next set of dynamic texture data.

In practice, the video service process, the camera service process and the 3D engine may provide a thread pool, so as to support concurrent data access and enhance performance. Two register lists that the video service process, the camera service process and the 3D engine can concurrent access are the free list and the send list. For the video service process, two register lists that the image capture engine and the graphics engine of the video service process can concurrently access are the free list and the send list. Two register lists of the video service process, the camera service process and the 3D engine are protected by thread-locking to ensure an exclusive access for multiple threads within one same process.

After the 3D engine generates the map from the dynamic texture data, the 3D engine sends a request for releasing a corresponding register to the camera service process, so that the camera service process releases the corresponding register in response to the request.

Figure 7:
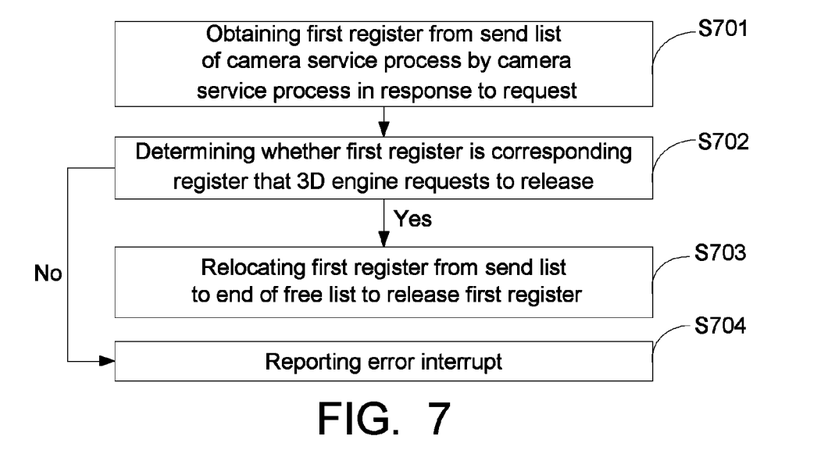
FIG. 7 is a flowchart of a camera service process releasing a corresponding register in a video data conversion method according to an embodiment of the present invention.

Referring to FIG. 7, in one embodiment, the step of the camera service process releasing the corresponding register in response to the request comprises the following sub-steps.

In sub-step S701, the camera service process obtains a first register from the send list of the camera service process in response to the request. When the camera service process receives the request from the 3D engine asking to release the corresponding register, the camera service process fetches a first register from the send list of the camera service process. Theoretically, for the data currently utilized by the 3D engine as well as the registers that are not yet released after being utilized in the send list of the camera service process, the order of registers in the send list and the order of registers before data is sent are the same. Hence, the register that is released each time is expectedly the first register in the send list, and so the first register is fetched from the send list each time a request for releasing a register is received.

In sub-step S702, it is determined whether the first register is the corresponding register that the 3D engine requests to release. That is, it is determined whether the first register fetched from the send list of the camera service process is the corresponding register that the 3D engine requests to release. Sub-step S703 is performed if yes, or else sub-step S704 is performed if no.

In sub-step S703, the first register is relocated from the send list to the end of the free list, thus releasing the first register. When the first register fetched from the send list of the camera service process is the corresponding register that the 3D engine request to release, the first register is relocated from the send list of the camera service process to the end of the free list, thereby releasing the first register and completing releasing of the corresponding register from the camera service process. The current process ends.

In sub-step S704, an error interrupt is reported. When the first register fetched from the send list of the camera service process is not the corresponding register that the 3D engine requests to release, an "assert" message as an error interrupt is reported, and the current process ends.

After the camera service process releases the corresponding register, the camera service process sends a request, for releasing the corresponding register, to the video service process, such that the video service process releases the corresponding register in response to the request.

Figure 8:
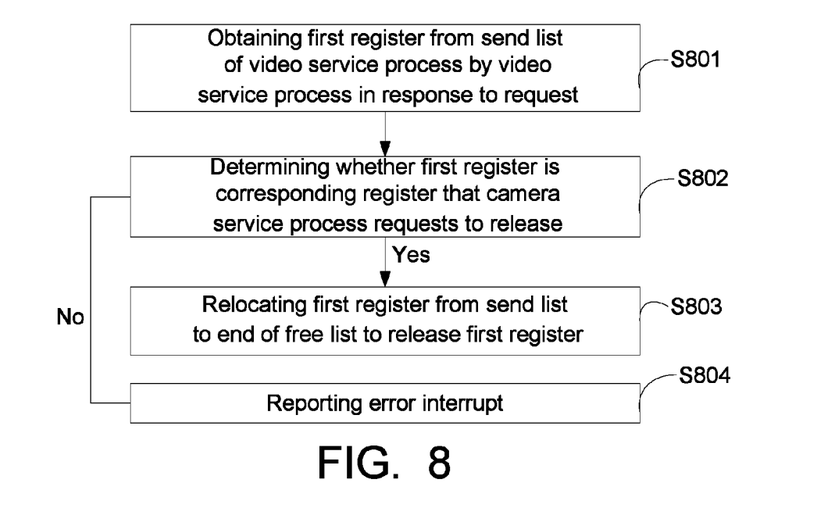
FIG. 8 is a flowchart of a video service process releasing a corresponding register in a video data conversion method according to an embodiment of the present invention.

Referring to FIG. 8, in one embodiment, the step of the video service process releasing the corresponding register in response to the request comprises the following sub-steps.

In sub-step S801, the video service process obtains a first register from the send list of the video service process in response to the request. After the camera service process releases the corresponding register in response to the request of the 3D engine, the camera service process sends a request, for releasing a corresponding register, to the video service process. The video service process fetches the first register from its send list in response to the request.

In sub-step S802, it is determined whether the first register is the corresponding register that the camera service process requests to release. More specifically, it is determined whether the first register fetched from the send list of the video service process is the corresponding register that the camera service process requests to release. Sub-step S803 is performed if yes, or else sub-step S804 is performed.

In sub-step S803, the first register is relocated from the send list to the end of the free list, thereby releasing the first register. When the first register fetched from the send list of the video service process is the corresponding register that the camera service process requests to release, the first register is relocated from the send list of the video service process to the end of the free list, thereby releasing the current first register and completing the release of the corresponding register from the video service process. The current process ends.

In sub-step S804, an error interrupt is reported. When the first register fetched from the send list of the video service process is not the corresponding register that the camera service process requests to release, an "assert" message as an error interrupt is reported, and the current process ends.

It is seen from the above description that, during the transmission process of the dynamic texture data, the registers of the video service process, the camera service process and the 3D engine are constantly relocated in the send list and the in the free list until the 3D UI calls a halt interface of the camera service process. At this point, the callback function is configured as "empty", the image capture operation of the video service process is halted, and the connections of the video service process, the camera service process and the 3D engine are terminated.

Figure 9:
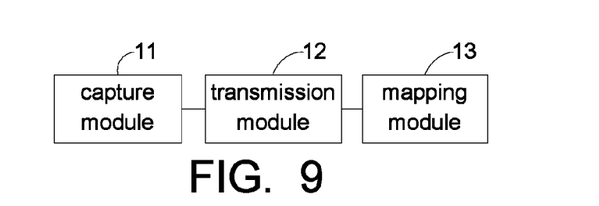
FIG. 9 is a schematic diagram of a video data conversion device according to an embodiment of the present invention.

FIG. 9 shows block diagram of a video data conversion device according to an embodiment of the present invention. The video data conversion device comprises a capture module 11, a transmission module 12 and a mapping module 13.

The capture module 11 captures video images currently played on a video source, converts the video images into dynamic texture data having a size and a format that meet requirements of a 3D engine, and sends the dynamic texture data to the transmission module 12.

Primarily, the capture module 11 captures video images currently played on a video source such as a DTV, ATV, HDMI, VGA and multimedia source, and converts the video images into dynamic texture data having a size and a format required by a 3D engine.

The transmission module 12 transmits the dynamic texture data.

The mapping module 13 generates a map from the dynamic texture data, and maps the map to a 3D UI to generate a dynamic texture map.

The mapping module 13 generates a map from the dynamic texture data sent from the transmission module 12, and maps the map to a 3D UI to obtain a new dynamic texture map.

Figure 10:
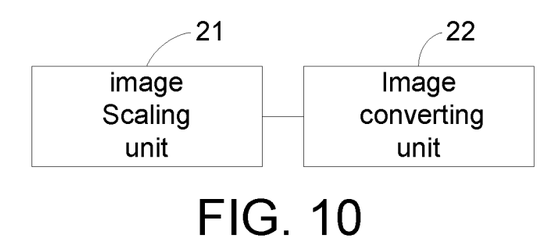
FIG. 10 is a schematic diagram of a capture module in a video data conversion device according to an embodiment of the present invention.

Referring to FIG. 10, the capture module 11 comprises an image scaling unit 21 and an image converting unit 22. The image scaling unit 21 captures the video images currently played on the video source, scales the video images to the size required by the 3D engine, and sends the scaled video images to the image converting unit 22.

The image scaling unit 21 scales the captured video images to the size required by the 3D engine according to parameter configurations of the 3D engine, and sends the scaled video images to the image converting unit 22.

The image converting unit 22 obtains the scaled video images, converts the scaled video images to dynamic texture data having the format required by the 3D engine, and sends the dynamic texture data to the transmission module 12.

The image converting unit 22 receives the scaled video images from the image scaling unit 21, and converts the scaled video images to dynamic texture data having the format required by the 3D engine according to parameter configurations of the 3D engine.

Figure 11:
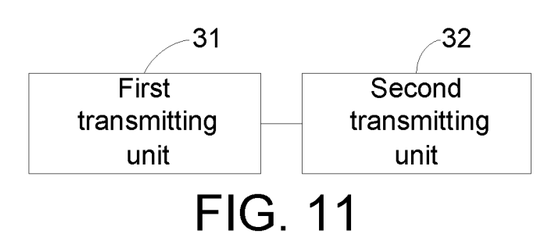
FIG. 11 is a schematic diagram of a transmission module in a video data conversion device according to an embodiment of the present invention.

Referring to FIG. 11, the transmission module 12 comprises a first transmitting unit 31 and a second transmitting unit 32. The first transmitting unit transmits the dynamic texture data from a video service process to a camera service process.

After receiving a request from the video service process asking for the dynamic texture data, the first transmitting unit 31 obtains the dynamic texture data from a register, and transmits the dynamic texture data to the camera service process. The first transmitting unit 31 duplicates the dynamic texture data to an available register of the video service process, and transmits the dynamic texture data to the camera service process by calling a callback function.

The second transmitting unit 32 transmits the dynamic texture data from the camera service process to the mapping module 13.

After receiving a request from the camera service process asking for the dynamic texture data, the second transmitting unit 32 transmits the dynamic texture data from the camera service process to the mapping module 13. The second transmitting unit 32 duplicates the dynamic texture data to the available register of the camera service process, and transmits the dynamic texture data to the mapping module 13 by calling a callback function.

In another embodiment, the video data conversion device further comprises a release module. The release module prompts the camera service process and the video service process to release the corresponding register of the dynamic texture data after the mapping module 13 generates a map.

After the mapping module 13 generates the map from the dynamic texture data, the release module prompts the camera service process to release the corresponding register of the current dynamic texture data. After the camera service process releases the corresponding register, the release module prompts the video service process to release the corresponding register of the current dynamic texture data.

In another embodiment, the video data conversion device further comprises a connection module. The connection module establishes the connections for the video service process, the camera service process and the 3D UI.

After the system is activated, the connection module prompts the video service process, the camera service process and the 3D UI to establish connections for readily obtaining the dynamic texture data.

In another embodiment, the video data conversion device further comprises a display module. The display module displays the dynamic texture data obtained by the mapping module 13. After the mapping module 13 obtains the dynamic texture data, the display module outputs and displays the dynamic texture data.

In another embodiment, the video data conversion device further comprises a video source selecting module for selecting the video source. The video source selecting module selects the video source, e.g., DTV, ATV, HDMI, VGA and multimedia, appointed by the 3D engine through a multiplexer.

In another embodiment, a smart TV is provided. The smart TV comprises the video data conversion device of any of the above embodiments.

In the video data conversion device, the associated method and the smart TV of the present invention, video images are captured and converted into dynamic texture data, and a new map is generated from the dynamic texture data by a 3D engine and mapped to a 3D UI. Thus, video data is converted to stable and continuous dynamic texture maps to achieve a higher frame rate. Further, video of a program is presented by incorporating 3D effects to offer users with enhanced viewing experiences.

Meanwhile, the video data conversion process, by incorporating concurrent data access, enhances not only system performance but also video data conversion efficiency.

With the foregoing embodiments of the present invention, it can be easily appreciated that, the device and method disclosed can be implemented through other approaches. For example, the implementation details in the description of the above device are illustrative. For example, the categorization of the modules or units is a logical functional categorization, and other categorization methods may be designed in other applications. For example, multiple units or elements may be combined or integrated into another system, or certain characteristics may be omitted or unexecuted. Further, the coupling, direct coupling or communication connections among the modules or units may be achieved via interfaces; the indirect coupling or communication connections among the devices or units may be in electrical, mechanical or other forms.

The units illustrated as discrete parts may or may not be physically separated; the units presented may or may not be physical units located at a physical location or distributed to multiple network units. A part or all of the units may be selected according to actual requirements to implement the embodiments.

Further, the functional units in the embodiments of the present invention may be integrated into one processing unit or may be independent physical units, or two or more of the functional units may be integrated into one unit. The integrated unit(s) may be implemented in form of hardware or software function units.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video data conversion method, comprising:
    capturing a video image currently played on a video source, and converting the video image into dynamic texture data having a size and a format required by a three-dimensional (3D) engine;
    transmitting the dynamic texture data to the 3D engine, so that the 3D engine generates a map from the dynamic texture data; and
    mapping the map to a 3D user interface (UI) to obtain a dynamic texture map.

2. The video data conversion method according to claim 1, wherein the step of capturing the video image currently played on the video source and converting the video image into the dynamic texture data having the size and the format required by the 3D engine comprises:
    capturing the video image currently played on the video source, and scaling the video image to the size required by the 3D engine by an image capture engine of a video service process; and
    obtaining the scaled video image, and converting the scaled video image into the dynamic texture data having the format required by the 3D engine by a graphics engine of the video service process.

3. The video data conversion method according to claim 2, wherein the step of transmitting the dynamic texture data to the 3D engine comprises:
    transmitting the dynamic texture data to a camera service process; and
    transmitting the dynamic texture data to the 3D engine by the camera service process.

4. The video data conversion method according to claim 3, wherein the step of transmitting the dynamic texture data to the camera service process comprises:
    preparing the dynamic texture data for transmission;
    determining whether a free list of the video service process has an available register;
    when the free list of the video service process has the available register, duplicating the dynamic texture data into the available register, or else obtaining new dynamic texture data for transmission; and
    relocating the available register containing the dynamic texture data to an end of a send list of the video service process to transmit the dynamic texture data to the camera service process.

5. The video data conversion method according to claim 4, wherein the step of transmitting the dynamic texture data to the 3D engine by the camera service process comprises:
    receiving a request from the 3D engine asking for the dynamic texture data by the camera service process;
    checking whether the free list of the camera service process has the available register by the camera service process in response to the request;
    when the available register exists, duplicating the dynamic texture data into the available register, or else aborting transmission of the current dynamic texture data; and
    relocating the available register containing the dynamic texture data to the end of the send list of the camera service process to transmit the dynamic texture data to the 3D engine.

6. The video data conversion method according to claim 1, further comprising:
    sending a request, for releasing a corresponding register, to the camera service process by the 3D engine; and
    releasing the corresponding register by the camera service process in response to the request.

7. The video data conversion method according to claim 6, wherein the step of releasing the corresponding register by the camera service process in response to the request comprises:
    obtaining a first register from the send list of the camera service process by the camera service process in response to the request;
    determining whether the first register is the corresponding register that the 3D engine requests to release;
    when the first register is the corresponding register that the 3D engine requests to release, relocating the first register to an end of a free list to release the first register; and
    when the first register is not the corresponding register that the 3D engine requests to release, reporting an error interrupt.

8. The video data conversion method according to claim 6, wherein the step of releasing the corresponding register by the camera service process in response to the request further comprises:
    sending a request to the video service process from the camera service process for releasing the corresponding register; and
    releasing the corresponding register by the video service process in response to the request.

9. The video data conversion method according to claim 8, wherein the step of releasing the corresponding register by the video service process in response to the request comprises:
    obtaining a first register from a send list of the video service process by the video service process in response to the request;
    determining whether the first register is the corresponding register that the camera service process requests to release;
    when the first register is the corresponding register that the camera service process requests to release, relocating the first register from the send list to an end of a free list to release the first register; and
    when the first register is not the corresponding register that the camera service process requests to release, reporting an error interrupt.

10. The video data conversion method according to claim 2, further comprising:

establishing connections for the video service process, the camera service process and the 3D engine.

11. The video data conversion method according to claim 10, wherein the step of establishing the connections for the video service process, the camera service process and the 3D engine comprises:

checking whether the connection between the camera service process and the video service process is successful;

when the connection between the camera service process and the video service process is successful, checking whether the camera service process supports parameters required by the 3D engine; when the connection between the camera service process and the video service process is unsuccessful, exiting the process; and when the camera service process supports parameters required by the 3D engine, configuring a callback function to activate the image capture engine of the video service process to capture the video image currently played on the video source; else, terminating the connections of the video service process, the camera service process and the 3D engine.

12. The video data conversion method according to claim 1, further comprising:

outputting the dynamic texture data to a display screen for display.

13. A video data conversion device, comprising:
a capture module;
a transmission module; and
a mapping module;
wherein, the capture module captures a video image currently played on a video source, converts the video image into dynamic texture data having a size and a format required by a 3D engine, and outputs the dynamic texture data to the transmission module; the transmission module transmits the dynamic texture data to the 3D engine, so that the 3D engine generates a map from the dynamic texture data; and the mapping module maps the map to a 3D UI to obtain a dynamic texture map.

14. The video data conversion device according to claim 13, wherein the capture module comprises an image scaling unit and an image converting unit;

the image scaling unit captures the video image currently played on the video source by an image capture engine of a video service process, scales the video image to the size required by the 3D engine, and transmits the scaled video image to the image converting unit; and the image converting unit obtains the scaled video image, converts the scaled video image into the dynamic texture data having the format required by the 3D engine, and outputs the dynamic texture data to the transmission module.

15. The video data conversion device according to claim 14, wherein the transmission module comprises a first transmitting unit and a second transmitting unit; the first transmitting unit transmits the dynamic texture data from the video service process to a camera service process; and the second transmitting unit transmits the dynamic texture data from the camera service process to the mapping module.

16. The video data conversion device according to claim 13, further comprising:

a release module, for prompting the camera service process and the video service process to release a corresponding register of the dynamic texture data after the mapping module generates the map.

17. The video data conversion device according to claim 13, further comprising:

a connection module, for establishing connections among the video service process, the camera service process, and the 3D engine.

18. The video data conversion device according to claim 13, further comprising:

a display module, for displaying the dynamic texture map.

19. The video data conversion device according to claim 13, further comprising:

a video source selecting module.

20. A smart TV, comprising:
a video data conversion device, wherein said video data conversion device comprises:
a capture module;
a transmission module; and
a mapping, module;
wherein, the capture module captures a video image currently played on a video source, converts the video image into dynamic texture data having a size and a format required by a 3D engine, and outputs the dynamic texture data to the transmission module; the transmission module transmits the dynamic texture data to the 3D engine, so that the 3D engine generates a map from the dynamic texture data; and
the mapping module maps the map to a 3D UI to obtain a dynamic texture map.

* * * * *